United States Patent
Schmidt et al.

(10) Patent No.: US 8,148,654 B2
(45) Date of Patent: Apr. 3, 2012

(54) MEDIUM-VOLTAGE OR HIGH-VOLTAGE SWITCHING OR CONTROL DEVICE, IN PARTICULAR A SWITCHGEAR ASSEMBLY

(75) Inventors: Karl-Michael Schmidt, Moers (DE); Ralf Henke, Bruehl (DE); Sven Wehrmann, Hilden (DE)

(73) Assignee: ABB Technology AG, Zurich (CH)

( * ) Notice: Subject to any disclaimer, the term of this patent is extended or adjusted under 35 U.S.C. 154(b) by 60 days.

(21) Appl. No.: 12/572,834

(22) Filed: Oct. 2, 2009

(65) Prior Publication Data
US 2010/0039752 A1 Feb. 18, 2010

Related U.S. Application Data

(63) Continuation of application No. PCT/EP2008/002715, filed on Apr. 4, 2008.

(30) Foreign Application Priority Data

Apr. 5, 2007 (DE) .......... 10 2007 016 952
Apr. 3, 2008 (DE) .......... 10 2008 017 429

(51) Int. Cl.
*H01H 27/00* (2006.01)

(52) U.S. Cl. ........... 200/43.06; 200/43.04; 200/43.05; 200/51.09

(58) Field of Classification Search ........... 200/50.17, 200/50.21, 50.23, 50.28, 50.31, 51 R, 51.05, 200/51.06, 51.09, 43.01–43.06; 439/135, 439/174, 540.1, 544, 545, 559, 289, 928.1; 312/223.1, 223.2, 223.6, 265.1, 265.4, 265.5; 174/50, 65 R; 361/600, 601, 602, 605, 611, 361/614, 627, 628, 633, 634, 635, 636, 641, 361/644, 645
See application file for complete search history.

(56) References Cited

U.S. PATENT DOCUMENTS

| | | | | |
|---|---|---|---|---|
| 4,689,718 A * | 8/1987 | Maue et al. | ........... | 361/736 |
| 5,282,112 A * | 1/1994 | Bremer | ........... | 361/729 |
| 5,544,004 A * | 8/1996 | Inagaki et al. | ........... | 361/633 |
| 5,817,976 A * | 10/1998 | Yanase et al. | ........... | 174/59 |
| 6,430,035 B2 * | 8/2002 | Skold et al. | ........... | 361/605 |
| 6,431,894 B1 * | 8/2002 | Boiret et al. | ........... | 439/189 |
| 6,454,368 B1 * | 9/2002 | Bedau et al. | ........... | 312/223.1 |
| 6,597,578 B2 * | 7/2003 | Shiina et al. | ........... | 361/728 |
| 6,781,822 B1 * | 8/2004 | Mercer et al. | ........... | 361/679.02 |
| 6,821,152 B2 * | 11/2004 | Van Dyke | ........... | 439/620.21 |
| 7,322,842 B2 * | 1/2008 | Duck et al. | ........... | 439/289 |
| 7,511,945 B2 * | 3/2009 | Scott | ........... | 361/627 |

FOREIGN PATENT DOCUMENTS

DE 43 38 171 C1 4/1995
(Continued)

OTHER PUBLICATIONS

International Search Report (PCT/ISA/210) for PCT/EP2008/002715 mailed Sep. 11, 2008.

*Primary Examiner* — Michael Friedhofer
(74) *Attorney, Agent, or Firm* — Buchanan Ingersoll & Rooney PC (57) ABSTRACT

A switchgear assembly is disclosed wherein to combine individual functions to form a standardized unit, without deviating from known technology, electrical cabling between the electrical functional components of the switchgear assembly can be replaced by a wiring in a box. The electrical components can each be connected directly to the box by a bundle of bound cables. Another embodiment includes a coding plug for being plugged from the exterior.

16 Claims, 5 Drawing Sheets

FOREIGN PATENT DOCUMENTS

| | | | |
|---|---|---|---|
| DE | 296 05 846 U1 | 5/1996 |
| DE | 298 13 657 U1 | 10/1998 |
| DE | 198 55 431 A1 | 5/2000 |
| DE | 199 11 196 A1 | 9/2000 |
| DE | 10 2004 006851 A1 | 9/2005 |
| GB | 1 108 529 A | 4/1968 |

* cited by examiner

MEDIUM-VOLTAGE OR HIGH-VOLTAGE SWITCHING OR CONTROL DEVICE, IN PARTICULAR A SWITCHGEAR ASSEMBLY

RELATED APPLICATIONS

This application claims priority as a continuation application under 35 U.S.C. §120 to PCT/EP2008/002715, which was filed as an International Application on Apr. 4, 2008 designating the U.S., and which claims priority to German Application 10 2007 016 952.5 filed in Germany on Apr. 5, 2007 and German Application 10 2008 017 429.7 filed in Germany on Apr. 3, 2008. The entire contents of these applications are hereby incorporated by reference in their entireties.

FIELD

The disclosure relates to a low-voltage, medium-voltage or high-voltage switching or control device, such as a switchgear assembly, and to applications thereof.

BACKGROUND INFORMATION

Switchgear assemblies form components for electrical power transmission and distribution. Their versatile capabilities and complex functions can, on the one hand, contribute to general safety, and on the other hand can ensure the availability of electrical power.

The basic design of known medium-voltage switchgear assembly, for example, includes a primary part and a secondary part. The electrical power is distributed via the primary part while the secondary part controls and monitors the primary switching devices and circuits.

Depending on the customer's philosophy and requirement profile, widely different equipment can be used for the secondary technology.

In principle, a distinction is drawn in secondary technology between switchgear assembly control and switchgear assembly control assisted by a microprocessor.

In the case of microprocessor-assisted assembly control, programmable logic multifunctional relays carry out numerous functions such as protection, control, measurement, monitoring and visualization of the switchgear assembly.

By way of example, a multifunctional relay is known, such as the REF542plus from ABB, which offers the capability for freely programmable control of the required functions, and their assignment to virtually any desired binary inputs and outputs. This allows the system designer a high degree of standardization for his secondary-technical components and their wiring.

The high degree of standardization assists the use of plug connectors and prefabricated cable harnesses. This makes a major contribution to high secondary technology availability. An exemplary advantage of this technique is the maintenance-friendliness.

Secondary technology can be implemented using discrete equipment such as pushbuttons, signaling lights, display instruments for current, voltage, etc., measured-value converters, protective relays, auxiliary relays and mechanical auxiliary switches.

The functions can be produced by wiring the individual equipment/components to one another. Owing to the multiplicity of possible functions and the equipment that is used in this case, a standardized wiring configuration is not practical.

The various installation locations of the numerous equipment items in the control cabinet and in the control cabinet door result in the following exemplary disadvantages:

Increased use of terminal blocks because of the multiplicity of interfaces.

The use of prefabricated cable harnesses is not practical, because of the large number of installation locations and equipment items.

Lack of electrical plug connections on the components.

Large amount of interconnection effort to produce all the functions.

Wiring technology that is not maintenance-friendly.

SUMMARY

A switchgear assembly is disclosed, comprising: individual electrical functional components to be controlled; and a connecting box with wiring to interconnect the electrical functional components, the electrical functional components being directly connected to the box via a bound cable run.

A switchgear assembly is disclosed, comprising: individual electrical functional components to be controlled; a first connecting strip to which connections of the electrical functional components are connected directly; and a second connecting strip connected to the first connecting strip, to which a coding plug is fitted, on which desired function-determining wiring or contacts are physically implemented as switching elements.

A switchgear assembly is disclosed, comprising: individual electrical functional components to be controlled; and a connecting strip to which connections of the electrical functional components are connected directly, and which includes an outer connection face for holding a coding plug, on which desired function-determining wiring or contacts are physically implemented as switching or linking elements.

BRIEF DESCRIPTION OF THE DRAWINGS

Refinements of the disclosure are indicated in the drawings, in which.

DETAILED DESCRIPTION

Figure 1:
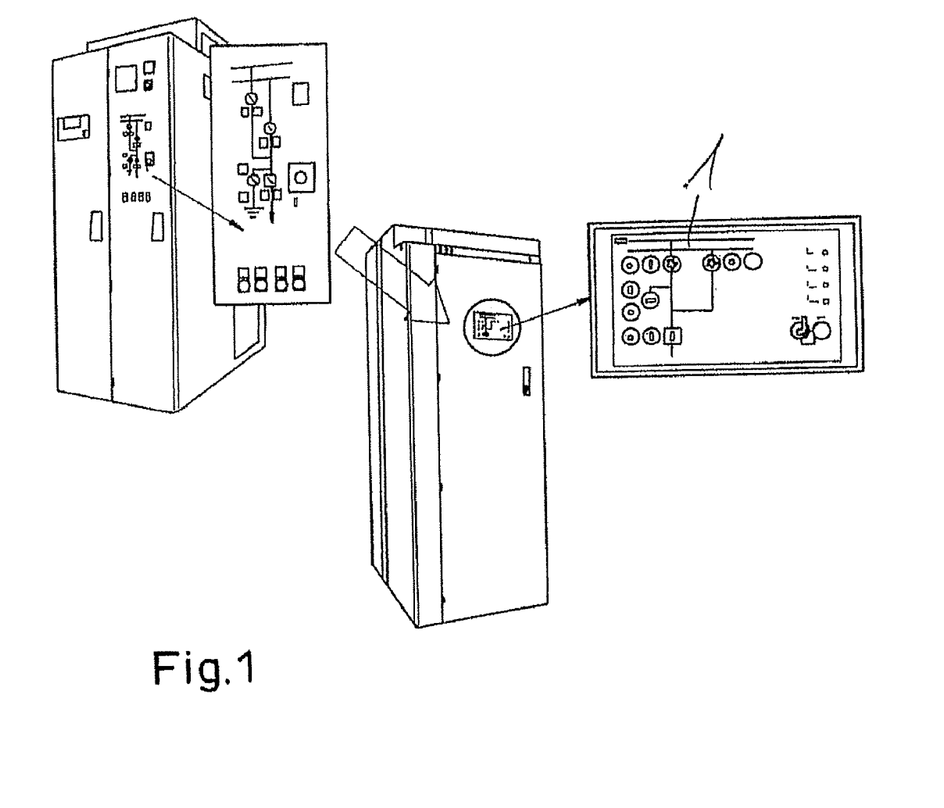
FIG. 1: shows an exemplary switchgear cabinet with an integrated box.

FIG. 1 shows an exemplary switchgear cabinet with an integrated box. Exemplary embodiments as disclosed herein can exploit advantages of microprocessor-controlled technology with known secondary technology.

Standards from an infinitely large number of different functions can be applied to a large number of switch panels, and recurrent functions can be combined to form a standard. Custom-specific functions can be at least partially standardized where possible.

Exemplary embodiments combine individual functions to form a standardized unit without departing from the known technology approach.

Electrical wiring between the electrical functional components of the switchgear assembly is replaced by wiring in a box or board, wherein the electrical components can be each connected directly to the box only by a bound cable run.

In another application of the function of the switchgear assembly to be implemented, the connections of the electrical components can be connected directly to a first connecting strip. The first connecting strip can be connected to a second connecting strip or provided with a further connection face, to or into which a coding plug can be fitted, on which the desired function-determining wiring or contacts can be physically implemented by switching elements.

An exemplary embodiment provides that the connections of the electrical components are connected directly to a connecting strip which has an outer connection face for holding a coding plug, on which the desired function-determining wiring or contacts can be physically implemented by switching or linking elements.

A further embodiment provides that the coding plug contains mechanical switching elements, for example in the form of electrically conductive links.

A further embodiment provides for the coding plug to contain switching elements which can be operated electrically or electronically. In this variant, a completely electronic version of the coding plug can be used. In this case and in this exemplary embodiment, the electrical connections need not be made as in the first-mentioned exemplary embodiment by switching or linking elements which can be introduced mechanically. Instead, electrical connections can be provided via switching elements which are operated electronically and implemented in the electronic coding plug. The coding plug can then be operated, for example via a bus cable, in order to set a functional application.

A further embodiment provides for the connecting strip or the box to be arranged in a housing opening or door opening of the switchgear assembly such that it passes through the latter and is thus accessible from the outside as well.

A further embodiment provides for the connecting strip or the box to be arranged in the interior of the switchgear cabinet.

A further embodiment provides for the electrical contacts on the outer connection face of the connecting strip to be designed using a two-dimensional matrix structure.

A further embodiment provides for the connecting strip or the outer connecting strip to be formed from a plurality of layers, and therefore for the electrical contacts in the connecting strip to be distributed using a three-dimensional matrix structure.

A further embodiment provides that the mechanical electrical switching or linking elements are in the form of electrically conductive linking elements which can be fitted into the matrix contact structure in a straight line.

A further embodiment provides that the mechanical electrical switching or linking elements can be fitted into the matrix structure diagonally.

A further embodiment provides that the electrical linking elements contain contact pins which can be inserted into the multilayer three-dimensionally distributed contact levels of the connecting strip from the connection face, and that the contact pins include electrically conductive and electrically non-conductive contact pin sections.

A further embodiment provides that the conductive and non-conductive sections of the contact pin can be separated such that a freely variable sequence of electrically conductive and electrically non-conductive sections can be plugged together before the contact pin can be inserted into the connecting strip.

An exemplary assembly according to the disclosure can be provided as a switchgear assembly for operation of the components of a low-voltage switchgear assembly.

A switchgear assembly as disclosed herein can be provided for operation of the components of a medium-voltage switchgear assembly.

A switchgear assembly as disclosed herein can be provided for operation of the components of a high-voltage switchgear assembly.

A switchgear assembly as disclosed herein can be provided for control of the components of a device for automation purposes, such as
a gas or liquid analysis device,
a flow measurement device,
a sensor device,
a process valve control device.

Up to 18 switching devices (or more) can be installed in the switchgear cabinet door for control of, for example, a double-busbar installation. In FIG. 1, the unit integrated in the form of the box 1 (e.g., a box, board or panel) can be more prefabricated than the module for control of known panels. The box 1 can be a control, signalling and display unit integrated in a single housing, which replaces the entire previous known control of a switch panel. The previous known control system was converted one-to-one for this purpose, without using any active components.

Plug connectors and prefabricated cable harnesses can be now also used in the door wiring for this innovative solution, as in the case of a microprocessor-controlled embodiment. Customer-specific functions such as alarm signals and their technical implementation, for example based on the open-circuit or closed-circuit principle, acknowledgement capability, etc. can still be implemented and modified individually without having to physically modify the box 1 itself. The hardware always remains the same. Only the electrical linking elements that are used in the end govern the function, as shown in the following figures.

The standardization of the wiring in the control cabinet can represent a stringent requirement. Because of the numerous equipment items in the control cabinet, complex interconnections and cross-wiring of the individual lines initially may not be avoided despite optimization of the wiring sequence by a CAD system.

Figure 2:
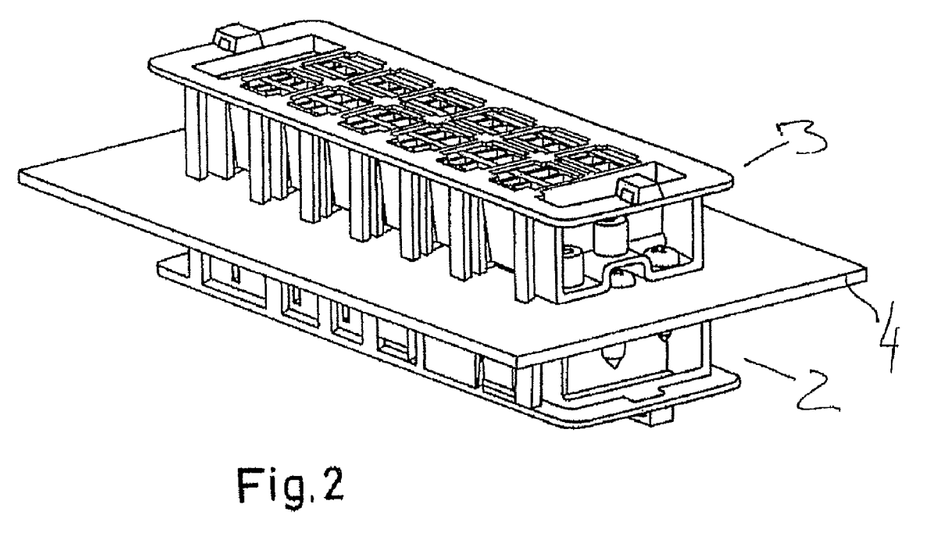
FIG. 2: shows exemplary first and second connecting strips.

In order to restrict the actual wiring complexity to the customer-specific functions, the box 1 of FIG. 2 has been developed containing standard interconnections in just a single unit within the switch panel, and being connected to all the components via plug connectors.

Terminal blocks can now be used exclusively for customer-specific functions. The absence of the normal terminal box and the contact dimensions of the box can considerably reduce the space required. The box can be installed as a prefabricated, ready-tested unit.

Customer-specific functions can also optionally be integrated in the box.

Figure 3:
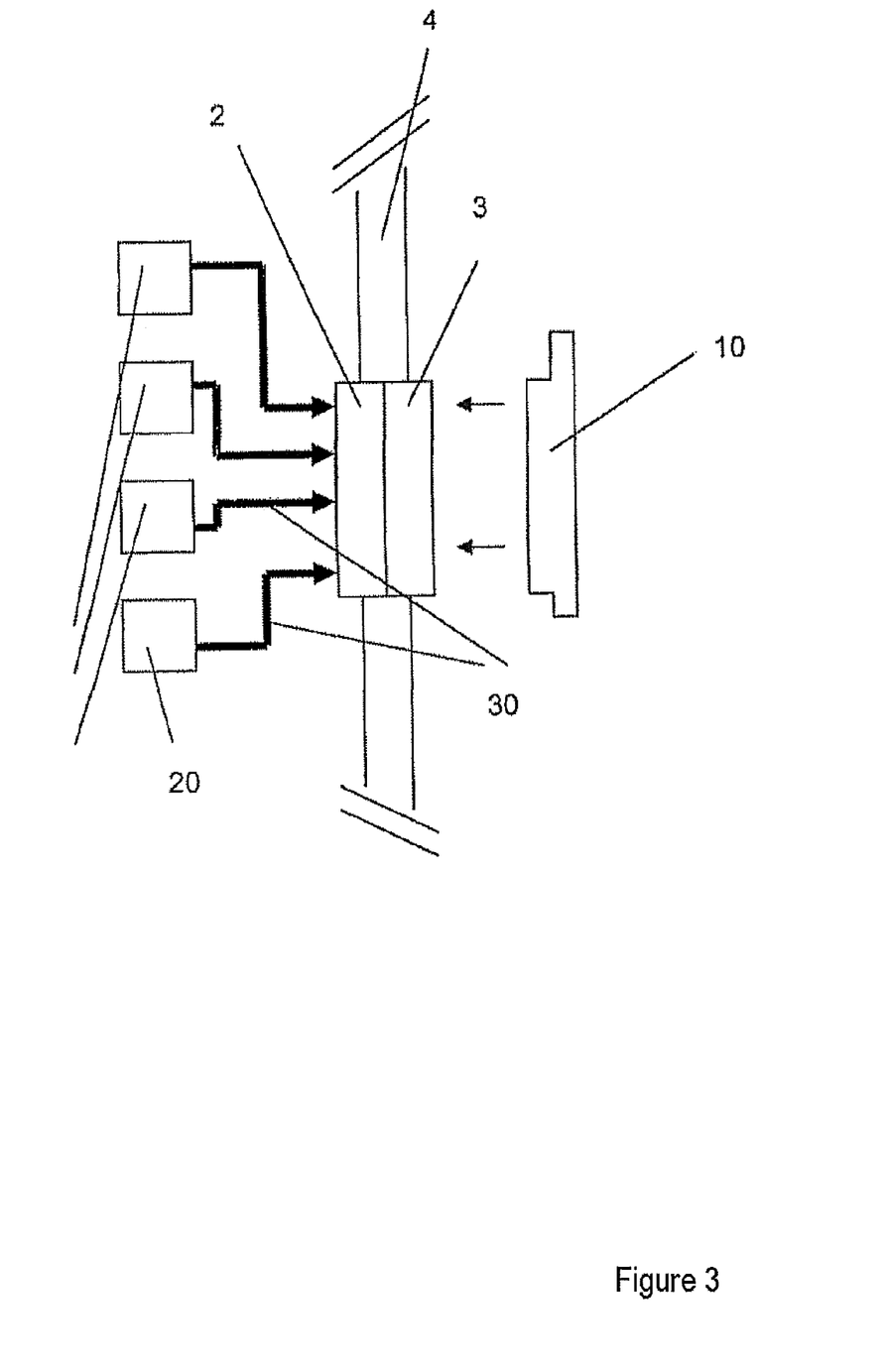
FIG. 3: shows an exemplary schematic wiring.

FIG. 3 shows a further variant which relates to a specific refinement of the terminal block for a switchgear assembly.

The box 1 according to the above embodiment, which is referred to as a working project, has a first connecting strip 2 to which all of the individual FIG. 3 components 20 to be controlled in the switchgear cabinet or in the switch panel can be connected by means of in each case one common (e.g., single) cable harness, which is connected to a plug. The connecting strip 2 is also referred to as a box 1 and can be implemented in this form or contained in this box, and in an exemplary embodiment contains the prefabricated wiring.

This can avoid actual direct "flying" wiring in the switchgear cabinet, as already described.

This procedure, which can be advantageous in its own right, can physically define the functions with the terminal block wiring.

This procedure can be replaced by a procedure of even further reduced complexity whose chosen switching functions can also easily be changed.

An exemplary solution according to the disclosure can be used to plug a prefabrication or coding plug 10 onto the connection face of the connecting strip 3, which now implements the respectively desired switching functions in the switchgear assembly, that is produced in a standardized form.

In this case, the connecting strip 3 contains the connecting face onto which the coding plug 10 can be plugged.

The coding plug 10 can also be fitted with physical functional switches or contact links 5, making or breaking the electrical links appropriate for the function, or the coding plug may be electronic or may be electronically operated, for example via a bus cable, so that the function that is finally implemented can also be implemented from outside, for example by remote setting.

Furthermore, the connecting strips can also be formed in two parts and can be fitted through the housing, so that the plugs together with the cable harnesses 30 to the individual components 20 can be fitted on the inner terminal block part within the switchgear cabinet, while the other terminal block which is connected to it is arranged on the outside of the housing. The coding plug 10 can then be plugged in on the outer connecting strip 3.

Exemplary Advantages:

The switchgear assemblies can be manufactured uniformly. The respective switching functions can in this case easily be chosen via the respectively selected coding plug. This can result in simplified, lower-cost, uniform manufacture.

The electronic coding plug option can allow the switchgear assembly to be controlled remotely, to be monitored remotely, and even to be diagnosed remotely in the event of a fault.

The embodiment illustrated in FIG. 3 relates to an exemplary variant with the terminal block externally accessible through the housing or door wall. A housing-internal arrangement and mounting of the terminal block or blocks can also be used.

Figure 4:
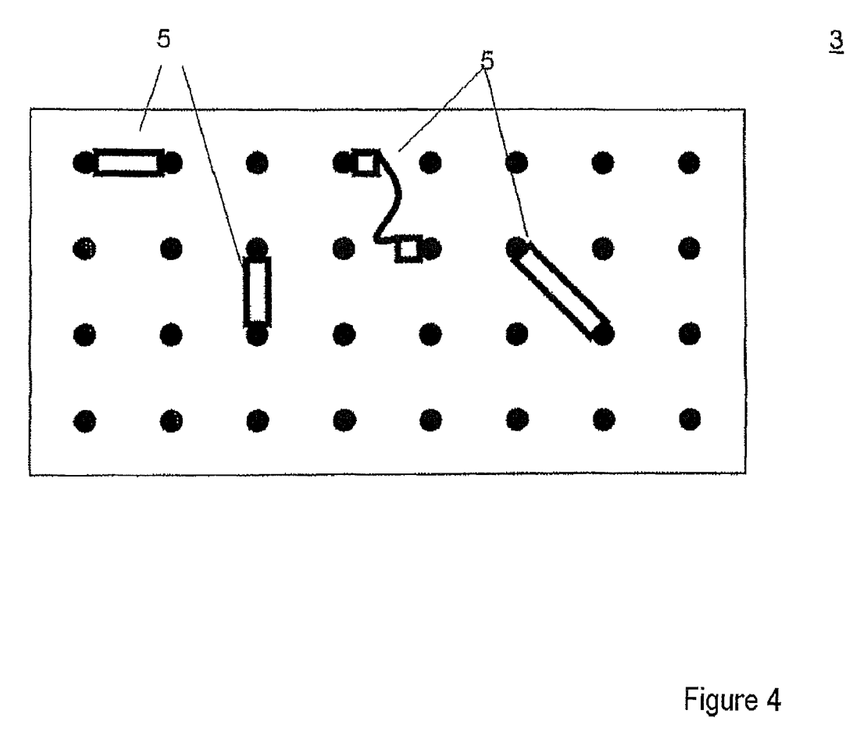
FIG. 4: shows an exemplary two-dimensional matrix structure of the connection face of the connecting strip or of the coding plug.

FIG. 4 shows a schematic illustration of an exemplary connection face 3, or the connection face of the coding plug 10. The points represent the individual contact points of the coding plug 10. Electrically conductive contact links 5 which run in a straight line can now in this case be plugged on, distributed such that they are aligned in the x and y directions, thus in the end resulting in the individual electrical components 20 of the switchgear assembly being interconnected.

Furthermore, however, the contact links 5 may also connect individual contact points to one another as diagonal links, that is to say as contact links which run diagonally. For example, only links in the x or y direction are used. However, considerably better flexibility can be achieved with the aid of these diagonal links. The straight-line links as well as the diagonal links can, for example, be in the form of rigid linking elements with two contact pins and a rigid connection between the two, or can have two contact pins connected flexibly, for example to a flexible cable.

The connection face illustrated here, or the contact face of the coding plug 10, can be designed 2-dimensionally. The connection face or the coding plug can, however, also have contact points arranged regularly and distributed 3-dimensionally. The coding plug can then have a plurality of, in each case, two-dimensional contact levels in layers one above other, thus resulting in the contact points being distributed 3-dimensionally.

Figure 5:
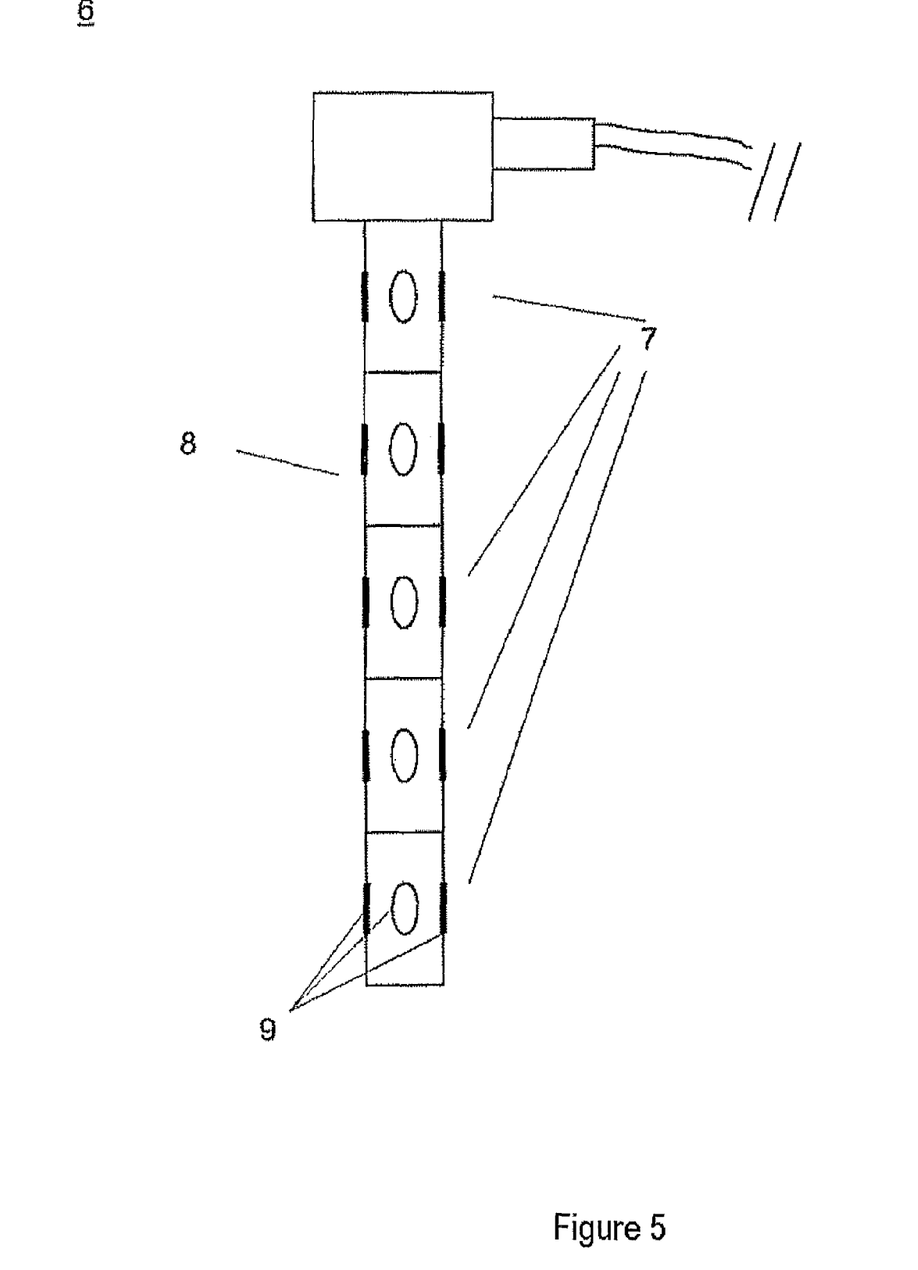
FIG. 5: shows an exemplary contact pin.

With respect to the 3-dimensional embodiment of the contact-making process, FIG. 5 shows corresponding contact pins 6, with which the contact pins 5 are then provided for three-dimensional electrical wiring or linking.

For this purpose, the contact pin 6 can be provided with electrically conductive and electrically non-conductive insulating sections 7 and 8, respectively. In one particular refinement, these sections can even be separated so that a respectively individual contact pin can be assembled from a variable, for example freely variable, sequence of electrically insulating and electrically conductive sections 7, 8. The respective predetermined contact in the z-dimension can therefore then be made with a uniform configuration of a 3-dimensional coding plug 10 or a 3-dimensionally designed connection face of the connecting strip.

In order to make contact better, the sections 7 and 8 can, for example, be provided with thickened attachments 9 on all sides, with the aim of making electrical contacts with an electrical contact resistance that is as low as possible.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SYMBOLS

1 Box in a switchgear cabinet of a medium-voltage switchgear assembly, (e.g., a switchgear cabinet door)
2 First connecting strip
3 Second connecting strip with a 2-dimensional connection face in the form of a matrix (or with 3-dimensionally layered connecting levels)
4 Wall of the switchgear cabinet door
5 Contact links
6 Contact pin
7 Electrically conductive section
8 Electric insulating section
9 Contact attachment
10 Coding plug
20 Electric components
30 Cable harness, cable run

What is claimed is:

1. A medium- or high-voltage switchgear assembly, comprising:
    individual electrical functional components to be controlled; and
    a connecting box with wiring to interconnect the electrical functional components, the electrical functional components being directly connected to the box via a bound cable run,
    wherein the connecting box includes a first connecting strip to which connections of the electrical functions are connected directly, and a second connecting strip connected to the first connecting strip,
    wherein a mechanically programmable coding plug is fitted to the second connecting strip, and desired function-determining wiring or contacts are physically implemented as switching elements on the coding plug.

2. The switchgear assembly as claimed in claim 1, wherein the connecting box is arranged in a housing opening or door opening of the switchgear assembly to be externally accessible.

3. The switchgear assembly as claimed in claim 1, wherein the connecting box is arranged in the interior of the switchgear cabinet.

4. A switchgear assembly according to claim 1, comprising:
components of a medium-voltage switchgear assembly.

5. A switchgear assembly according to claim 1, comprising:
components of a high-voltage switchgear assembly.

6. A switchgear assembly according to claim 1, wherein the electrical functional components are components of a device for automation purposes, and include at least one of a gas or liquid analysis device, a flow measurement device, a sensor device, and a process valve control device.

7. A medium- or high-voltage switchgear assembly, comprising:
individual electrical functional components to be controlled;
a first connecting strip to which connections of the electrical functional components are connected directly; and
a second connecting strip connected to the first connecting strip,
wherein a mechanically programmable coding plug is fitted to the second connecting strip, and desired function-determining wiring or contacts are physically implemented as switching elements on the coding plug.

8. A medium- or high-voltage switchgear assembly, comprising:
individual electrical functional components to be controlled;
a connecting strip to which connections of the electrical functional components are connected directly, and which includes an outer connection face for holding a mechanically programmable coding plug,
wherein desired function-determining wiring or contacts are physically implemented as switching or linking elements on the coding plug.

9. The switchgear assembly as claimed in claim 8, wherein the coding plug contains mechanical switching elements.

10. The switchgear assembly as claimed in claim 8, wherein the coding plug contains electrically or electronically operated switching elements connected for signaling purposes to a bus cable.

11. The switchgear assembly as claimed in claim 8, wherein the electrical contacts or the connection face of the connecting strip include a two-dimensional matrix structure.

12. The switchgear assembly as claimed in claim 11, wherein the outer connection face is formed from a plurality of layers, and the electrical contacts in the connecting strip are distributed using a three-dimensional matrix structure.

13. The switchgear assembly as claimed in claim 11, wherein the mechanical electrical switching or linking elements are electrically conductive linking elements which can be fitted into the matrix contact structure in a straight line.

14. The switchgear assembly as claimed in claim 13, wherein the electrical linking elements contain contact pins inserted into the multilayer three-dimensionally distributed contact levels of the connecting strip from the outer connection face, and the contact pins comprise electrically conductive and electrically non-conductive contact pin sections.

15. The switchgear assembly as claimed in claim 14, wherein the conductive and non-conductive contact pin sections are separated such that a freely variable sequence of electrically conductive and electrically non-conductive sections are plugged together before a contact pin is inserted into the connecting strip.

16. The switchgear assembly as claimed in claim 11, wherein the mechanical electrical switching or linking elements can be fitted into the matrix structure diagonally.

* * * * *